Aug. 11, 1964

R. J. WEBB ETAL 3,144,551

BERYLLIUM MONITOR MEANS UTILIZING AN
ELECTRIC ARC AND SPECTRUM ANALYZER

Filed March 28, 1960

INVENTORS
ROBERT JOHN WEBB
MAURICE STEPHEN WILLIAM WEBB
PETER CHARLES WILDY

BY
*Lawson and Taylor*

INVENTORS
ROBERT JOHN WEBB
MAURICE STEPHEN WILLIAM WEBB
PETER CHARLES WILDY

BY
*Larson and Taylor*

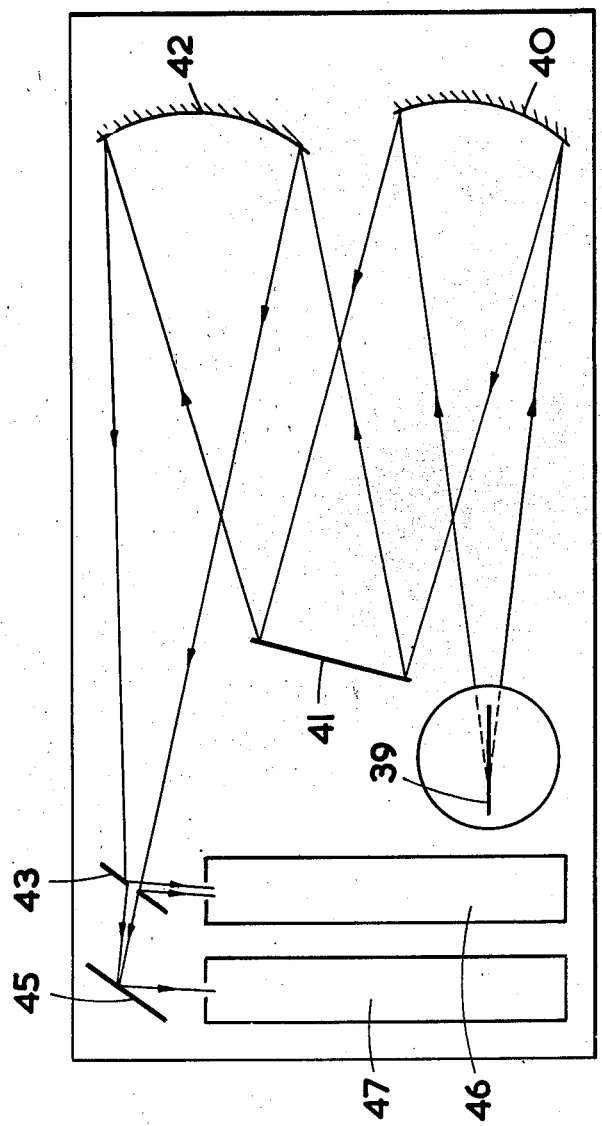

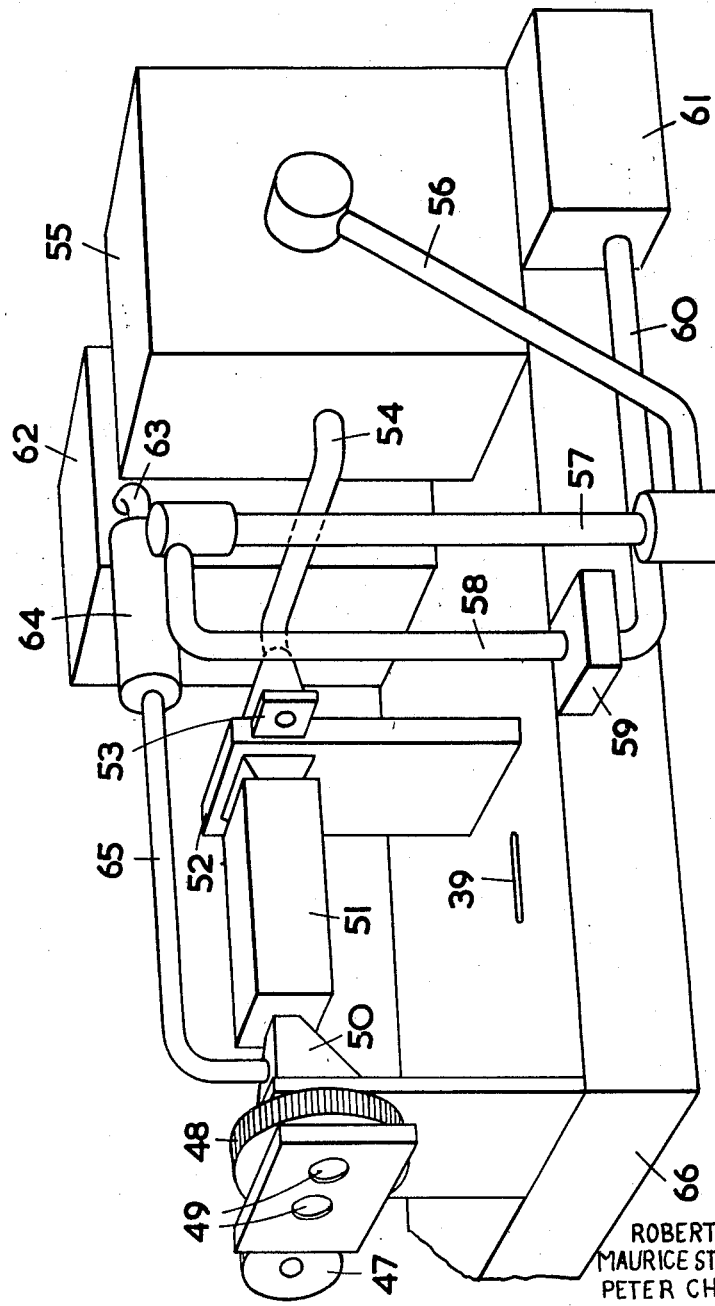

United States Patent Office 3,144,551
Patented Aug. 11, 1964

3,144,551
BERYLLIUM MONITOR MEANS UTILIZING AN ELECTRIC ARC AND SPECTRUM ANALYZER
Robert John Webb, Welling, Kent, Maurice Stephen William Webb, Brighton, and Peter Charles Wildy, Thornton Heath, England, assignors to United Kingdom Atomic Energy Authority, London, England
Filed Mar. 28, 1960, Ser. No. 18,061
10 Claims. (Cl. 250—43.5)

The present invention relates to an apparatus and process for direct spectrographic quantitative measurement of small amounts of a selected element in a gas or gas mixture.

The aparatus of the present invention makes possible the direct quantitative measurement of the concentration of elements in a gas or gas mixture which is unaffected by the particle size of the material whose concentration is being measured as long as this is below a certain maximum which will depend upon the element concerned and the compound in which it is present if it is not in the elemental form. In the case of beryllium, particles having a diameter up to 50 microns do not affect the accuracy of measurement. The method of the present invention can measure concentrations to an accuracy of $\pm 30\%$, when the overall concentration of the material being measured in the gas is below 80 microgram per cubic metre and each sample is taken over a time period of 20 seconds.

An object of the invention is to provide spectrographic analysis apparatus comprising two electrodes contained in an arc chamber lined with an insulating material, the arc chamber including a window transparent to the radiation produced in the arc, a gas inlet in such a position with relation to the electrodes that gas will enter an arc between the electrodes, and an outlet connected, via a flowmeter, to the atmosphere, means for splitting the radiation into a spectrum, and means for measuring directly and recording directly the intensity of any chosen part of the spectrum, the position of the window being such that the radiation from the arc passes through it into the means for splitting the radiation into a spectrum.

The invention also provides a process for the quantitative measurement of an element contained in a gas or gas mixture which comprises feeding the gas or gas mixture into an intermittent electric arc discharge and then withdrawing the gas or gas mixture from the electric discharge, the radiation emitted by the material in the discharge being split into a spectrum, and the intensity of a chosen line of the spectrum relative to the intensity of an adjacent portion of said spectrum being used to measure and record the quantity of element present.

The gas or gas mixture need not be fed into the electric discharge at the same angle to the direction of discharge as that at which it is withdrawn, although normally these angles will be approximately the same. The gas or gas mixture must obviously be withdrawn in such a way that it does not pass through the discharge a second time. Although the gas may be fed in parallel to the arc preferably the angle between the direction in which the gas or gas mixture is fed into the electric discharge, and the direction of discharge is not less than 30° and not greater than 60°, more preferably not less than 40° and not greater than 50°.

The speed at which the gas or gas mixture is fed into the discharge must be such that the discharge can be maintained in equilibrium. Using a feed angle of between 30° and 60° the speed at which the gas is fed into the discharge is preferably between 20 and 50 litres per minute.

The elements which can be measured are those that will emit characteristic spectra when subjected to an intermittent electric arc discharge and include beryllium, mercury, lead, chromium, manganese, silicon, arsenic, antimony, zinc and copper. The present invention will be described with particular reference to beryllium. Since this metal has toxic effects, the accurate measurement of quantities of beryllium or beryllium compounds in the air is of considerable importance. It is also important that measurements should be direct and accomplished quickly so that if the quantity of beryllium present in the air goes above the allowable limit any necessary action can be taken without delay. In monitoring measurement of the concentration of beryllium present in air, it is important that the monitor apparatus should not be affected by the particle size or by the chemical or physical form in which the beryllium is present.

The accuracy of the method depends to a considerable extent upon the line or lines chosen from the spectrum of the element whose concentration is being measured. Care must be taken to choose a line which is quite distinct and which is not near to any background line, or to any line due to the material from which the electrodes are made. To measure the intensity of any line in the spectrum, the intensity of an adjacent portion of the spectrum (containing no lines) is measured, and, by subtraction, the relationship between the concentration of the element present in the air and the intensity of the chosen line (in the case of beryllium the 3130/3131A doublet has been found suitable) is approximately linear. The concentration present therefore can be obtained by comparing the relative intensity of the line with the relative intensity of the equivalent line obtained from a standard sample of known concentration. Having measured the concentration of the element, if the element is present as a compound, the concentration of the compound present can be determined.

In the case of beryllium, the standard sample is obtained by passing filtered air through a spark set up between beryllium-copper electrodes. The sample is then passed through the arc and the intensity of the chosen line measured. For the initial calibration of the standard sample after it has been passed through the arc, the sample may be passed through filter paper and the amount of beryllium deposited on the paper by a known volume of air measured by standard chemical means.

The arc discharge must be of a length sufficient to allow full excitation of the particles passing through the arc. It has been found preferable to have an arc length of at least 4 mm., and more preferably of between 8 mm. and 2.00 cm.

The apparatus according to the present invention includes an arc chamber containing two electrodes which may be made from any suitable material not giving a line close to the chosen line of the element being measured. Noble metals, such as platinum and gold, are normally suitable, and in the case of beryllium, copper electrodes with platinum tips have been found satisfactory. Other metals which may be used for the electrodes include tantalum, niobium, zirconium, hafnium, iridium and tungsten. Since it is normally desired to use the monitor for long periods of time without overhaul, it is preferred to use a metal for the electrodes which does not oxidise or does not oxidise appreciably, but if the monitor is being used for short periods of time this is not important. Copper electrodes have been used without platinum tips for the measurement of beryllium for short periods of time.

The arc chamber itself is preferably lined with or made from an insulating material, for example syndanyo, which is a bonded asbestos material having both insulating and heat-resisting properties, and contains a window of material transparent to the radiation, for example quartz, and so arranged that radiation can pass straight through it and into the means for splitting the radiation into a spectrum. This is normally a monochromator, preferably combined with two photomultipliers to increase the sensitivity of measurement, one of the photomultipliers being arranged to observe the chosen line and the other to observe the background. The intensity of the chosen line relative to the background is then recorded directly on a ratio recorder.

The voltage source attached to the electrodes may be of any standard intermittent A.C. arc or triggered D.C. type, but is preferably of the former type.

The invention will now be illustrated with respect to the embodiments shown in the following diagrams, in which:

FIG. 4 is a diagram of a monochromator and photomultipliers;

FIG. 5 illustrates an arrangement of the apparatus of the present invention employing the monochromator illustrated in FIGURE 4.

Figure 1:
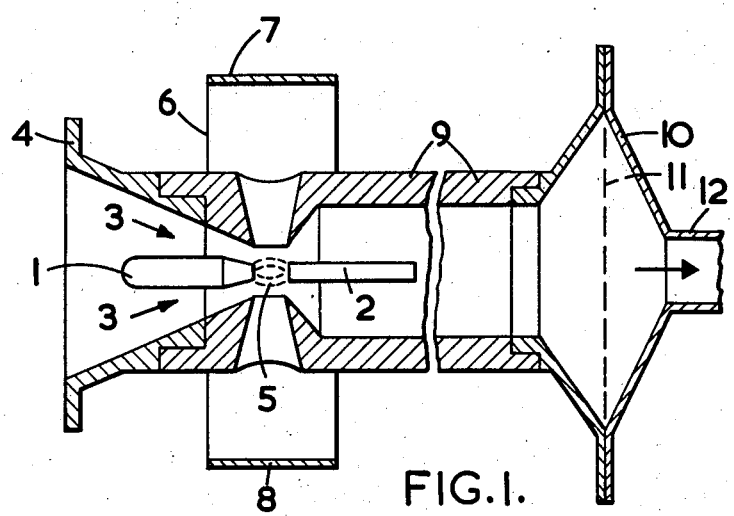
FIG. 1 is a diagram of the arc chamber.
Figure 2:
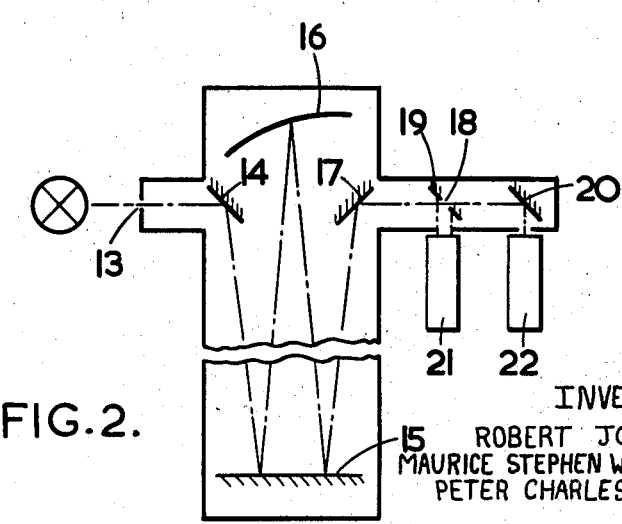
FIG. 2 is a diagram of a monochromator and photomultipliers.

Referring to FIGURES 1 and 2, the beryllium-containing air is fed through funnel 4 (FIG. 1), the inner part of which is made of insulating material, through opening 3 in the chamber 6, and into the arc 5 between the electrodes 1 and 2. Using a voltage in the region of 240, an arc length of approximately 1 cm. has been found suitable. The air is then withdrawn through the tube 9, and cone 10, and finally through the tube 12 to the purification apparatus. When the apparatus is being calibrated a standard sample is passed through the arc 5 and the filter paper 11, which is then removed and the beryllium concentration measured by spectrochemical analysis. A flowmeter for measuring the volume of air which passes through the arc is incorporated in the apparatus at a position after that where the air passes through the arc. The radiation emitted by the material in the arc passes through the quartz window 7 into the monochromator (FIG. 2) via slit 13. The radiation is then reflected from mirror 14 to mirror 15 and on to diffraction grating 16, which splits the radiation up into a spectrum. The grating is arranged at an angle such that that part of the spectrum containing the beryllium 3130/3131A doublet is reflected back on to mirror 15, to mirror 17, through slit 18 in mirror 19, on to mirror 20 and into photomultiplier 22. Part of the background adjacent to that part of the spectrum containing the beryllium doublet 3130/3131A is reflected from the mirror 19 into photomultiplier 21. The ratio of the intensity of the beryllium doublet to the intensity of the background is recorded on a ratio recorder. The record on the ratio recorder is compared with the record obtained for a standard sample containing a known concentration of beryllium.

Figure 3:
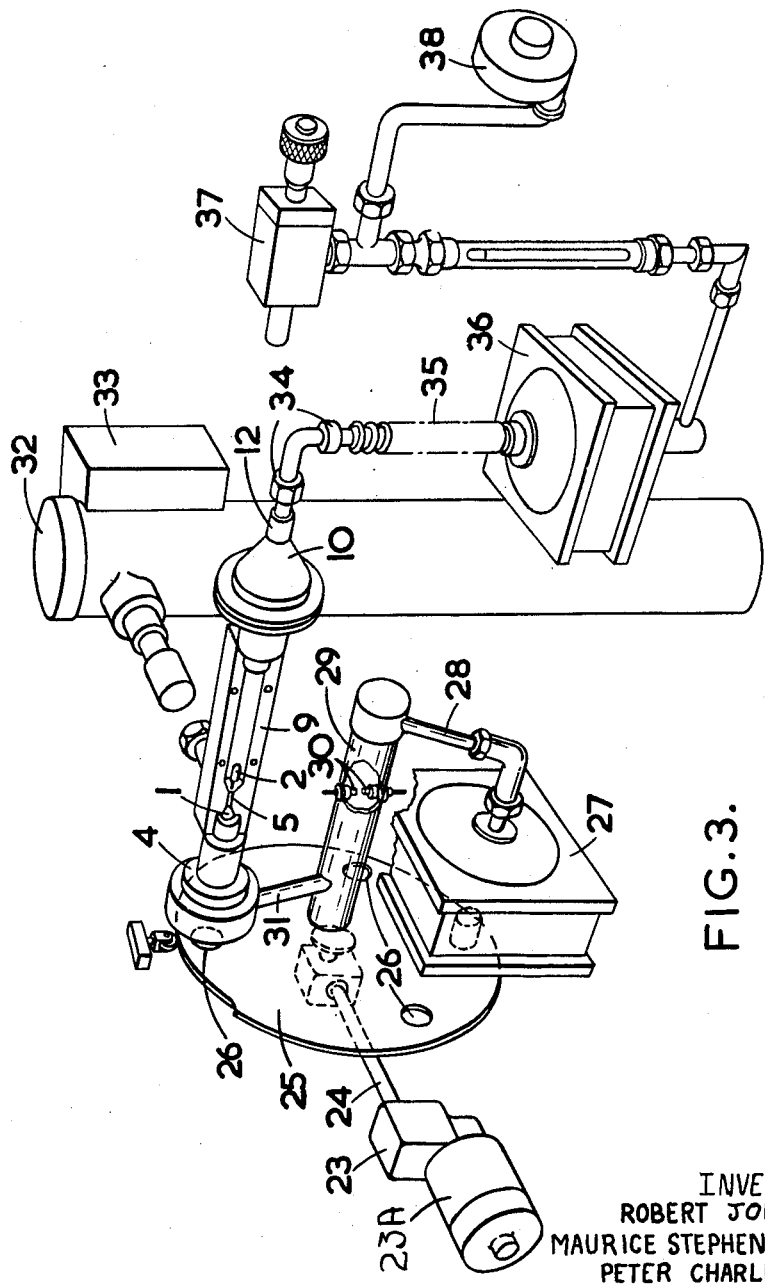
FIG. 3 illustrates an arrangement of the apparatus of the present invention employing the monochromator illustrated in FIGURE 2.

FIGURE 3 illustrates an embodiment of the apparatus according to the present invention incorporating the arc chamber illustrated in FIGURE 1, and the monochromator illustrated in FIGURE 2. To calibrate the apparatus a standard sample is obtained by passing air through air filter unit 27, then through the tube 28, and into the spark chamber 29. The spark chamber 29 contains two beryllium-copper electrodes 30, the tips of which are separated by a distance of approximately 1 mm., the potential across this gap just before the passage of the spark being approximately 5 kilovolts. The standard sample produced by the spark then passes, via tube 31 and funnel 4, into the arc chamber 9. Here it passes through the arc 5 set up between electrodes 1 and 2, and then through the filter paper contained in cone 10. The concentration of the beryllium in the sample is measured by spectrochemically analysing the amount of beryllium deposited on the filter paper during the passage of a given volume of the sample through the cone 10. The air (either the standard sample or the contaminated air) then passes through tubes 12 and 35, which are joined by bolts 34 in such a way that the arc chamber 9 can be removed to replace the electrodes 1 and 2 when necessary. Tube 35 leads into filter unit 36 which removes the beryllium contamination in the air. A suction pump 38 and a flow control unit 37, which includes a flowmeter, are connected to the duct leading from the filter unit 36 to the atmosphere.

Motor 23A rotates cam 25, via reduction gear 23 and shaft 24, in such a manner as to close the duct leading into air filter unit 27 and the opening leading from tube 31 into funnel 4, and allow contaminated air into funnel 4 from the atmosphere via a port 26 in the cam 25. The radiation emitted while the contaminated air or the standard sample is passing through arc 5, passes through a quartz window (not shown) into monochromator 32 and photomultipliers 33. The relative intensity of the beryllium doublet is then recorded on a ratio recorder and compared with the record obtained from the standard, whereby the concentration of the beryllium in the air is read directly.

A second arrangement of the apparatus of the present invention is illustrated in FIGURES 4 and 5. The arc chamber 51 (FIG. 5) is the same as that illustrated in FIGURE 1, but is contained in a separate unit which can be simply removed, thus enabling replacement of the electrodes to be undertaken with ease. Air containing beryllium enters the apparatus through intake ports 49, passes via the duct 50 into the arc chamber 51. The air then passes through the filter paper holder 52 via pipe 54 into the air filter unit 55. Pipe 56 leads from the air filter unit 55, via flowmeter 57 and pipe 58, through flow control unit 59, pipe 60, box 61 (which contains electrical leads, etc.), and via a pump (not shown) to the atmosphere. Motor 47 drives shutter 48 in such a way that when intake ports 49 are closed the entrance from pipe 65 to arc chamber 51 is open. The standard sample is obtained by filtering air through filter unit 62, after which the air passes through pipe 63, spark chamber 64, and pipe 65 into the funnel 50.

The radiation emitted while the sample or the contaminated air passes through the arc in the arc chamber 51 passes through a quartz window (not shown) in the arc chamber 51 and into the monochromator-photomultiplier unit 66 via slit 39.

The monochromator-photomultiplier unit 66 is illustrated in FIGURE 4. The radiation is reflected by a plane mirror (not shown) underneath the slit 39, on to a concave mirror 40. The mirror 40 reflects parallel radiation on to a diffraction grating 41, which splits the radiation into a spectrum and reflects, as parallel radiation that part of the spectrum containing the chosen line on to concave mirror 42, which mirror focusses the 3130/3131A beryllium doublet through the slit in mirror 43 on to plane mirror 45 from where it is reflected into photomultiplier 47, and the background on to plane mirror 43 from where it is reflected into photomultiplier 46. The relative intensity of the beryllium doublet is then recorded directly as beryllium concentration on a ratio recorder.

In the embodiments shown in the figures, it has been found preferable to draw the contaminated air through the arc chamber at a speed of 40 litres/minute.

We claim:

1. Apparatus for the quantitative analysis of a selected solid contaminating element in particulate form in a gas comprising a spectrum analysis chamber, an arc chamber, a pair of spaced electrodes located in the arc chamber and defining an arc therebetween, means to pass said gas containing the solid contaminating element through said arc chamber and said arc to produce radiation, means to measure the rate of flow of said gas, a window in said arc chamber positioned to enable passage of the radiation from said arc to the spectrum analysis chamber, an image slit in said spectrum analysis chamber aligned with said window and said arc, means to form a spectrum of the radiations entering said image slit, a first object slit positioned to admit a selected line in said spectrum, a second object slit positioned to admit background radiation adjacent said line, and means to compare the relative intensities of radiation admitted by said two object slits.

2. Apparatus for the quantitative analysis of a selected solid contaminating element in particulate form in a gas comprising a spectrum analysis chamber, an arc chamber, a pair of spaced arc electrodes located in the arc chamber and defining an arc therebetween, means to pass said gas containing the solid contaminating element through the arc chamber and said arc at an angle to the arc of between 0° and 60° to produce radiation, means to measure the rate of flow of said gas, a window in said arc chamber positioned to enable passage of the radiation through the window from said arc to the spectrum analysis chamber, an image slit in said spectrum analysis chamber aligned with said window and said arc, means to form a spectrum of the radiations entering said image slit, a first object slit positioned to admit a selected line in said spectrum, a second object slit positioned to admit background radiation adjacent said line, first and second photomultipliers respectively receiving radiation from said first and second object slits, and a ratio recorder connected to said photomultipliers to indicate the comparative intensity of said line relative to said background radiation.

3. Apparatus for the quantitative analysis of a selected solid contaminating element in particulate form in a gas comprising a spectrum analysis chamber, an arc chamber, a pair of spaced arc electrodes located in the arc chamber and defining an arc therebetween, means to pass said gas containing the solid contaminating element through said arc chamber and through said arc to produce radiation, means to measure the rate of flow of said gas, a window in said arc chamber positioned to enable passage of the radiation through said window from the arc to the spectrum analysis chamber, an image slit in said spectrum analysis chamber aligned with said window and said arc, a monochromator to form a spectrum of the radiations entering said image slit, a first object slit positioned to admit a selected line in said spectrum, a second object slit positioned to admit background radiation adjacent said line, and means to compare the relative intensities of radiation admitted by said two object slits.

4. Apparatus for the quantitative analysis of a selected solid contaminating element in particulate form in a gas comprising a spectrum analysis chamber, an arc chamber, a pair of spaced arc electrodes located in the arc chamber and spaced by between 8 mm. and 20 mm., means to establish and maintain an arc between said arc electrodes, means to pass said gas containing the solid contaminating element through said arc chamber and through the arc at an angle to said arc of between 40° and 50° to produce radiation, means to measure the rate of flow of said gas, a window in said arc chamber positioned to enable passage of the radiation through said window from the arc to the spectrum analysis chamber, an image slit in said spectrum analysis chamber aligned with said window and said arc, a monochromator to form a spectrum of the radiations entering said image slit, a first object slit positioned to admit a selected line in said spectrum, a second object slit positioned to admit background radiation adjacent said line, first and second photomultipliers respectively receiving radiation from said first and second object slits, and a ratio recorder connected to said photomultipliers to indicate the comparative intensity of said line relative to said background radiation.

5. The apparatus of claim 4 further including comparison means including a second pair of electrodes containing the said selected element, means to maintain an arc between said second pair of electrodes, means to pass gas through said arc and thence to said arc chamber and means to remove said element from the gas leaving said arc chamber.

6. In a process for the qualitative analysis of a selected solid element in particulate form contaminating a gas, the steps of forming and maintaining an arc discharge between electrodes, flowing said gas through said arc at a measured rate at normal pressure to excite said element, receiving the radiation from said arc and forming same into a spectrum, locating a line in said spectrum characteristic of said element and measuring the intensity of such line relative to the intensity of an adjacent portion of said spectrum not containing a line.

7. Apparatus according to claim 1 wherein the means to form a spectrum includes a diffraction grating to split the radiations into a spectrum.

8. Apparatus according to claim 2 wherein the means to form a spectrum includes a diffraction grating to split the radiations into a spectrum.

9. Apparatus according to claim 3 wherein the monochromator includes a diffraction grating to split the radiations into a spectrum.

10. Apparatus according to claim 4 wherein the monochromator includes a diffraction grating to split the radiations into a spectrum.

References Cited in the file of this patent

UNITED STATES PATENTS

| | | |
|---|---|---|
| 1,856,969 | Reiter et al. | May 3, 1932 |
| 2,486,622 | White | Nov. 1, 1949 |
| 2,577,815 | Sanderson et al. | Dec. 11, 1951 |
| 2,640,870 | Seitz | June 2, 1953 |
| 2,670,649 | Robinson | Mar. 2, 1954 |
| 2,740,894 | Deisler et al. | Apr. 3, 1956 |
| 2,774,277 | Machler | Dec. 18, 1956 |
| 2,885,555 | Blumer | May 5, 1959 |
| 2,959,677 | Robinson et al. | Nov. 8, 1960 |
| 3,025,745 | Liston | Mar. 20, 1962 |
| 3,032,654 | Fay et al. | May 1, 1962 |
| 3,088,364 | Rozsa et al. | May 7, 1963 |